Nov. 28, 1950     C. A. PORTER     2,531,700
POLYVINYL ALCOHOL COMPOSITIONS
CONTAINING CORROSION INHIBITOR
Filed Jan. 7, 1949
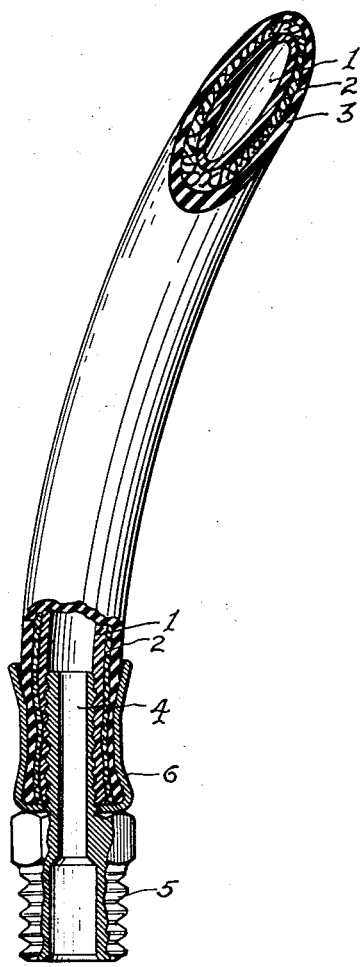
Inventor
Charles A. Porter
By Williams, Rich & Morse
Attorneys Patented Nov. 28, 1950

2,531,700

UNITED STATES PATENT OFFICE 2,531,700

POLYVINYL ALCOHOL COMPOSITIONS CONTAINING CORROSION INHIBITOR

Charles A. Porter, West Caldwell, N. J., assignor to Resistoflex Corporation, Belleville, N. J., a corporation of New York Application January 7, 1949, Serial No. 69,847

5 Claims. (Cl. 138—47)

This invention relates to polyvinyl alcohol compositions, more particularly to such compositions containing an inhibitor of corrosion.

Polyvinyl alcohol is a hydrophilic synthetic resin adapted to many industrial uses because of its toughness, flexibility and especially its resistance to most organic solvents. It is usually used in a plasticized state, either by itself or laminated with or coated on other materials, in the production of such articles as tubing, hose, gaskets, diaphragms, printing roll surfaces and a variety of molded parts. In many of its industrial applications the body of polyvinyl alcohol composition is used in contact with metal surfaces which are readily oxidized.

In certain polyvinyl alcohol compositions ingredients used as plasticizers or modifying agents have a strong corrosive action on readily oxidized metals such as brass, ferrous metals and aluminum, particularly in the presence of moisture. Among such ingredients may be mentioned ammonium chloride, ethanol formamide and monoethanolamine hydrochloride. The hydrophilic nature of polyvinyl alcohol is conducive to the accumulation of moisture wherever the composition is exposed to the atmosphere, particularly under conditions of high relative humidity.

In a flexible hose assembly, for example, in which the hose is lined with plasticized polyvinyl alcohol tubing, the metal fittings, usually brass or aluminum, are in part directly in contact with the polyvinyl alcohol composition. During storage of such hose assemblies they are open to the atmosphere and where the said composition is one containing an ingredient conducive to corrosion difficulty may be experienced with the corrosion of the metal parts. At the same time it may be highly advantageous to be able to use a composition containing such an ingredient for the purpose of obtaining certain desired characteristics. The single figure of the drawing shows one end of a piece of hose with a metal fitting of well known construction attached to its end. The hose is shown as having a tubular lining 1 of polyvinyl alcohol composition surrounded by a layer of braid 2 and a covering 3 of rubber, neoprene or the like. The end fitting has a shank 4 which is inserted in the end of the tube 1, a connector portion 5 and a ferrule 6 contracted around the hose end. It will be observed that both the shank 4 and the inner edge of the ferrule 6 are in contact with the polyvinyl alcohol liner 1.

In other applications, gaskets, diaphragms and the like are clamped between metal parts and corrosion is likely to damage the metal surfaces in contact with the composition with resulting leaks and other difficulties. In molded bodies containing metal inserts corrosion may be very detrimental.

It is therefore the principal object of this invention to modify polyvinyl alcohol compositions by incorporation therein of an ingredient which will inhibit or prevent corrosion, of a detrimental nature, of metals in contact therewith.

Another object is to provide polyvinyl alcohol compositions containing ingredients normally tending to produce corrosion of oxidizable metals and also containing an inhibitor which acts to prevent such corrosion.

In accordance with the invention, it has been discovered that these objects are attained by the incorporation in a body of polyvinyl alcohol of 2-aminothiazole. With this inhibitor present in the composition, it has been discovered that no serious corrosion results even in the presence of normally highly corrosive ingredients such as ammonium chloride.

Illustrative of the advantages of the invention are the following examples:

Example 1

A composition was made up consisting of the following ingredients, parts by weight:

100 parts polyvinyl alcohol [1]
40 parts water
10 parts formamide
40 parts monoethanolamine hydrochloride This composition was molded into the form of a sheet. A thoroughly cleaned, polished brass disk was placed in contact with this sheet and the assembly left to stand at a temperature of 80–90° F. under average relative humidity conditions of about 30%. The disk was examined periodically and at the end of one month was found to be badly corroded, pitted and to be coated with a substantial accumulation of greenish corrosion products.

Example 2

A composition was made up as in Example 1 except for the addition of 10 parts of 2-aminothiazole and was tested under the same conditions. At the end of 48 hours the brass disk was coated with a light tarnish of dark color after which, during a period of one month, no further change appeared to take place.

---

[1] 98.5–100% saponified, 18–28 C. P. S. viscosity.

While the corrosion in Example 1 was progressive and corrosion products continued to build up, the initial slight attack in Example 2 was apparently due to the formation of a protective film on the brass which prevented subsequent corrosion and which was not in the least detrimental. While I do not wish to be limited thereby, I believe that the inhibiting effect of the 2-aminothiazole is due to the initial formation of a protective sulfide coating on the surface of the metal which prevents subsequent oxidation.

*Example 3*

A composition was made consisting of:

100 parts polyvinyl alcohol [1]
40 parts glycerol
40 parts water
10 parts formamide
4 parts ammonium chloride This composition was extruded in the form of tubing which was used as the liner of hose equipped with brass fittings and ferrules. These hose assemblies were subjected to 100% relative humidity at a temperature of 110° F. for from 5 to 10 days and showed progressive development of corrosion at the contacting surfaces of the metal fittings and the polyvinyl alcohol liner.

*Example 4*

Hose assemblies as described in Example 3 were made up with a liner having the same composition except for the addition of 10 parts of 2-aminothiazole. Tested under the same conditions, the hose assemblies made with this composition showed no signs of corrosion after a period of 40 days.

I have found that the useful range of corrosion inhibitor is from 2 to 20 parts by weight of 2-aminothiazole, based on the quantity of polyvinyl alcohol in the composition. The lower quantities will be incorporated in those compositions which do not contain any corrosive organic or inorganic salts and will be sufficient to prevent corrosion resulting primarily from the accumulation of moisture. Larger amounts are desirably incorporated in those compositions which do contain corrosive salts or where it is known that the article will be subjected to highly corrosive atmospheres.

The 2-aminothiazole may be incorporated in the composition merely by dissolving it in the liquid admixture of plasticizing and modifying ingredients and its solution is promoted by heating the admixture to 160–180° F. This admixture is then sprayed on the dry powdered polyvinyl alcohol with stirring and the desired articles are formed by molding or extrusion in the usual way. The presence of the 2-aminothiazole thereafter serves to protect against detrimental corrosion any oxidizable metal surface with which the article formed from the composition comes in contact.

While the invention has been described by reference to illustrative examples, it is to be understood that it is not limited to the details thereof and should be construed broadly within the purview of the claims.

What is claimed is:

1. A polyvinyl alcohol composition containing as a corrosion inhibitor 2-aminothiazole.

2. A polyvinyl alcohol composition containing as a corrosion inhibitor from 2 to 20 parts by weight, based on the polyvinyl alcohol, of 2-aminothiazole.

3. A plasticized polyvinyl alcohol composition containing ingredients having a corrosive action on metals and 2-aminothiazole as a corrosion inhibitor.

4. A flexible hose assembly consisting of a hose and metal fittings attached to the ends of the hose, said hose comprising a tube of plasticized polyvinyl alcohol in contact with said fittings, the body of said tube containing as a corrosion inhibitor 2-aminothiazole.

5. A flexible hose assembly consisting of a hose and a metal fitting attached to the end of the hose, said hose comprising a tube of plasticized polyvinyl alcohol in contact with said fitting, said tube containing 2-aminothiazole as a corrosion inhibitor.

CHARLES A. PORTER.

No references cited.

---

[1] 91–94% saponified, 15–25 C. P. S. viscosity.